(12) United States Patent
Shore et al.

(10) Patent No.: US 7,709,135 B2
(45) Date of Patent: May 4, 2010

(54) EFFICIENT PROCESS FOR PREVIOUS METAL RECOVERY FROM CELL MEMBRANE ELECTRODE ASSEMBLIES

(75) Inventors: Lawrence Shore, Edison, NJ (US); Ramail Matlin, Berkeley Heights, NJ (US); Robert Heinz, Ludwigshafen (DE)

(73) Assignee: BASF Corporation, Florham Park, NJ (US)

( * ) Notice: Subject to any disclaimer, the term of this patent is extended or adjusted under 35 U.S.C. 154(b) by 175 days.

(21) Appl. No.: 12/134,394

(22) Filed: Jun. 6, 2008

(65) Prior Publication Data

US 2009/0301260 A1 Dec. 10, 2009

(51) Int. Cl.
  H01M 8/00 (2006.01)
  C22B 3/06 (2006.01)
  C22B 3/10 (2006.01)
  C22B 11/06 (2006.01)
  B01D 3/00 (2006.01)
  B01D 3/36 (2006.01)

(52) U.S. Cl. .............................. 429/45; 75/744; 423/22; 23/306; 203/50; 203/99

(58) Field of Classification Search ................... 75/710, 75/711, 715, 743, 744; 429/49; 423/22; 210/649–651; H01M 6/50; C22B 11/00; C01G 55/00
See application file for complete search history.

(56) References Cited

U.S. PATENT DOCUMENTS 5,421,526 A  6/1995  Johansson et al.

FOREIGN PATENT DOCUMENTS

| DE | 102004041997 A1 | 3/2006 |
| JP | 2008036569 A | 2/2008 |
| WO | WO 2006/073840 A1 * | 7/2006 |
| WO | 2007034298 A | 3/2007 |
| WO | 2007071020 A | 6/2007 |
| WO | 2009029463 A | 3/2009 |

OTHER PUBLICATIONS

Shore, Lawrence, Platiunum Group Metal Recycling Technology Development, May 2007, BASF Catalysts LLC, 12+.*
J. E. Barnes and J. D. Edwards, "Solvent Extraction at INCO's Acton Precious Metal Refinery," *Chemistry and Industry*, Mar. 6, 1982, 151-155.
M. Alkan, et al, "Solubility of Chlorine in Aqueous Hydrochloric Acid Solutions," *Journal of Hazardous Materials*, vol. 119, Issues 1-3, Mar. 17, 2005, p. 13-18.

(Continued)

*Primary Examiner*—Jerry Lorengo
*Assistant Examiner*—Jared Wood
(74) *Attorney, Agent, or Firm*—Bernard Lau

(57) ABSTRACT

A method is provided for recovering a catalytic element from a fuel cell membrane electrode assembly. The method includes grinding the membrane electrode assembly into a powder, extracting the catalytic element by forming a slurry comprising the powder and an acid leachate adapted to dissolve the catalytic element into a soluble salt, and separating the slurry into a depleted powder and a supernatant containing the catalytic element salt. The depleted powder is washed to remove any catalytic element salt retained within pores in the depleted powder and the catalytic element is purified from the salt.

24 Claims, 7 Drawing Sheets

OTHER PUBLICATIONS

U.S. Appl. No. 11/844,723, Shore, et al.

Shore L: "Platinum Group Metal Recycling Technology Development" 2009 Doe Hydrogen and Vehicle Technologies Program Annual Merit Review and Peer Evaluation Meeting, Washington DC, May 21, 2009, XP002547227 Retrieved from the Internet.

Shore L: "Platinum Group Metal Recycling Technology Development" FY2008 Annual Progress Report Doe Hydrogen Program, Aug. 19, 2008, pp. 935-938, XP002547228 Retrieved from the Internet.

Shore L: "Platinum Group Metal Recycling Technology Development" 2008 Doe Hydrogen Program Annual Merit Review and Peer Evaluation Meeting, Washington DC, Jun. 11, 2008, pp. 1-32, XP002547123.

Shore L: "Platinum Group Metal Recycling Technology Development" Doe Hydrogen Program: Annual Progress Report, Washington DC, Nov. 1, 2007, pp. 1027-1030, XP002502884 the whole document.

Shore L: "Platinum Group Metal Recycling Technology Development" BASF - Annual Merit Review & Peer Evaluation, Washington DC, May 18, 2007, pp. 1-21, XP002502883 the whole document.

* cited by examiner

US 7,709,135 B2

EFFICIENT PROCESS FOR PRECIOUS METAL RECOVERY FROM CELL MEMBRANE ELECTRODE ASSEMBLIES

GOVERNMENT SUPPORT

The work described herein was supported, in part, by grant DE-FC36-03GO13104 from the United States Department of Energy. Therefore, the U.S. Government may have certain rights in this invention.

BACKGROUND OF THE INVENTION

Fuel Cells are devices that release electrical energy using an electrochemical reaction. A major class of fuel cells utilizes hydrogen fuel, and the electrochemical oxidation of hydrogen to water is catalyzed using electrodes containing precious metal catalysts. Precious metal catalytic elements for use in precious metal catalysts include, but are not limited to, platinum (Pt), ruthenium (Ru), palladium (Pd), gold (Au), and rhodium (Rh). It is widely accepted that the high cost and limited supply of platinum and other catalytic elements are obstacles to large scale commercialization of fuel cells.

There are several types of fuel cells. Most common is the polymer electrolyte membrane (PEM) fuel cell. The PEM forms the basis for a membrane electrode assembly (MEA), which is the structure by which hydrogen can be oxidized to generate electricity. An anode (i.e., a negative electrode) is provided on one side of the PEM and a cathode (i.e., a positive electrode) is provided on the opposite side of the PEM. The anode contains a catalyst, typically comprising platinum, for promoting dissociation of hydrogen into electrons and positive hydrogen ions. The cathode also contains a catalyst, typically comprising platinum, for promoting reduction of oxygen. An MEA typically carries a catalytic element loading between about 0.5 mg/cm$^2$ and 4 mg/cm$^2$, although recent research has obtained effective performance with catalytic element loadings as low as 0.15 mg/cm$^2$. Typically, these loadings in current commercial fuel cells translate to about 0.5% to 2.0% by weight of catalytic element in the MEA.

A commonly used polymer electrode membrane is Nafion™ by E.I. DuPont de Nemours Company. Nafion™, a Teflon™-based polymer, is a sulfonated perfluropolymer. Even when using a membrane that is itself free of fluorine, a perfluropolymer ionomer is typically mixed into the electrocatalyst layers (i.e., the anion and the cation) to improve the mobility of the positive hydrogen ions. Additionally, the presence of a fluoride-rich polymer makes the powder of the MEA hydrophobic when the MEA is ground.

In one type of fuel cell, the anode and cathode are coated onto the PEM to form a catalyst coated membrane (CCM). A CCM fuel cell can include platinum, ruthenium, and other catalytic elements. In another type of fuel cell, a carbonaceous gas diffusion layer is applied to the anode and another carbonaceous gas diffusion layer is applied to the cathode to form a gas diffusion electrode (GDE). A GDE fuel cell can also include platinum, ruthenium, and other catalytic elements. The gas diffusion layers provide for the uniform distribution of hydrogen and oxygen to their respective sides of the PEM, provide a conductive pathway for electricity to be transmitted out of the fuel cell, and provide a porous means for the water produced by the electrochemical reaction to be transported away.

Another type of fuel cell using catalytic elements such as platinum is a alkaline fuel cell (AFC). Still another type of fuel cell using catalysts is a phosphoric acid fuel cells (PAFC), which use a polybenzylimidazole (PBI) membrane saturated with phosphoric acid electrolyte. Regardless of the type, after a period of use, a fuel cell often must be replaced, due to fouling of the catalyst, or for another reason. In particular, after repeated cycling of the fuel cell during operation (i.e., cycling between periods of high and low voltage generation), the catalyst can tend to migrate into the membrane and the catalytic element particles can become reduced in size and therefore less effective. Rather than simply disposing of a fuel cell that must be replaced, it is highly desirable to recover as much catalytic element as possible from the MEA, due to the value of the precious metal catalytic element.

The conventional approach to recover platinum and other precious metal catalytic elements from an MEA includes combusting the PEM and the carbonaceous diffusion layers, dissolving the resultant ash in acid, and purifying the precious metal using standard refining chemistry. However, the high fluorine content of the MEA, particularly those with Nafion™ or other Teflon™-based membranes, results in toxic emissions of hydrogen fluoride gas (HF) and other fluorine compounds from the combustion process.

SUMMARY OF THE INVENTION

A method is provided for recovering a catalytic element from a fuel cell membrane assembly. The method includes grinding the membrane electrode assembly into a powder, extracting the catalytic element by forming a slurry comprising the powder and an acid leachate adapted to dissolve the catalytic element into a soluble salt, and separating the slurry into a depleted powder and a supernatant containing the catalytic element salt. The depleted powder is washed to remove any catalytic element salt retained within pores of the depleted powder and the catalytic element is purified from the salt.

A method is provided for recovering platinum from a fuel cell membrane electrode assembly. The method includes shredding and cryogrinding the membrane electrode assembly into a powder, mixing the powder with a surfactant and a leachate to form a slurry, and separating the slurry into solids and a liquid, the liquid including a platinum salt. The platinum salt is then concentrated and the platinum refined from the platinum salt.

A method is provided for recovering platinum from a fuel cell membrane electrode assembly. The method includes shredding and grinding the membrane electrode assembly into a powder, adding a surfactant solution to the powder using a high shear mixer, and mixing hydrochloric acid and an oxidant with the powder to form a slurry having supernatant and solids. When the membrane electrode assembly contains phosphoric acid, the shredded powder can be leached with water to remove the phosphoric acid prior to adding surfactant. The slurry is then separated into supernatant and solids, the supernatant is distilled to separate a hydrochloric acid distillate and a heel. Platinum salts are concentrated in the heel and platinum is recovered from the platinum salts.

DESCRIPTION OF THE INVENTION

As used herein the term "catalytic element" is understood to include platinum or other precious metal catalytic material such as ruthenium, palladium, gold, and rhodium. Although the term "platinum" is often used interchangeably with the term "catalytic element," and platinum is frequently discussed as an exemplary catalytic element, it is understood that the methods described herein are equally applicable to other precious metal catalytic elements, including but not limited to ruthenium, palladium, gold, and rhodium.

Figure 1:
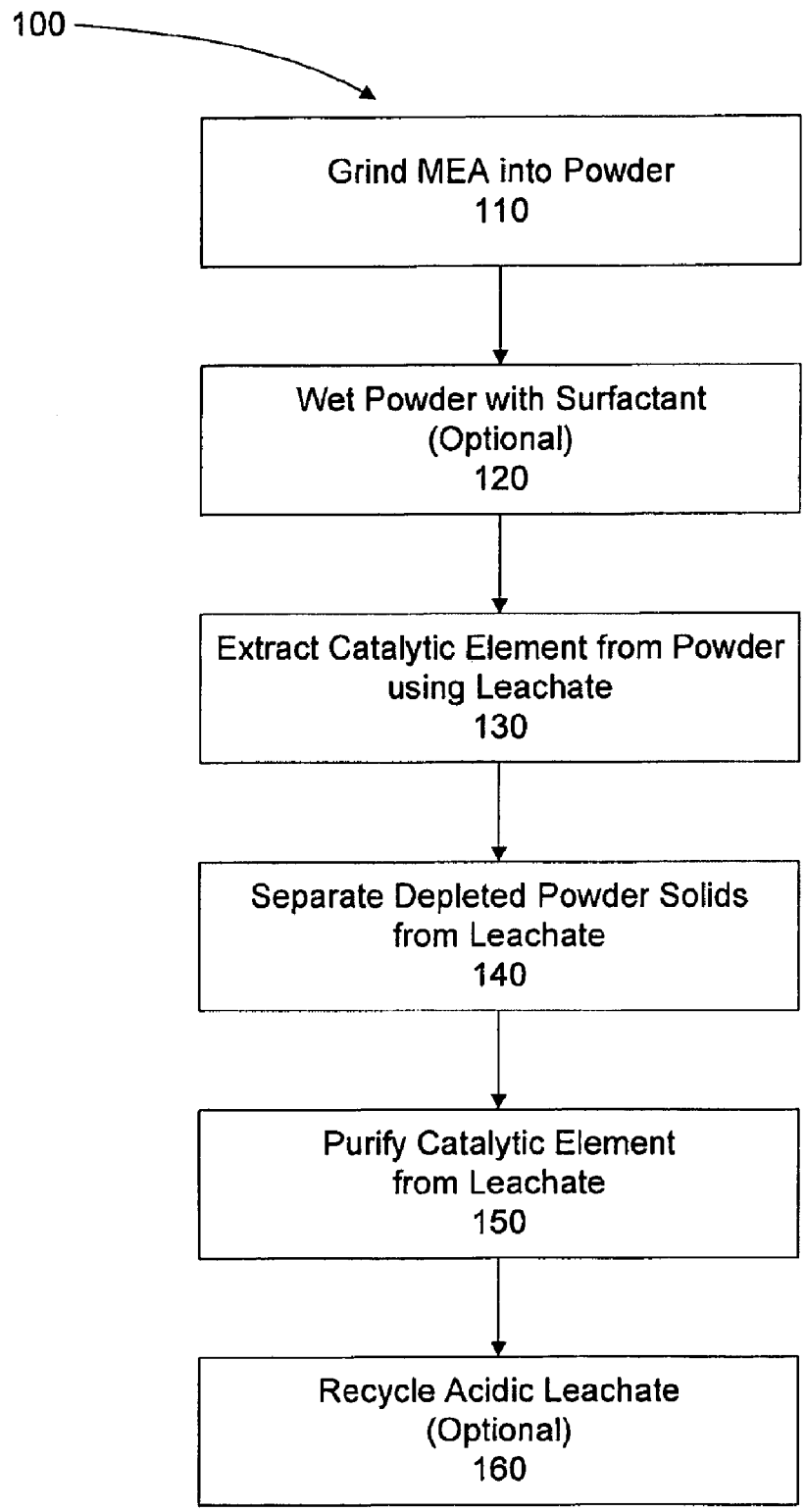
FIG. 1 is a flow chart showing a method for recovering a catalytic element from a fuel cell membrane electrode assembly.

Referring to the drawings, where like numerals identify like elements, there is shown in FIG. 1 a flow chart representation of a method for recovering a high percentage of precious metal catalyst from fuel cell membrane electrode assemblies. Recovery rates of platinum catalyst in excess of 98% have been achieved using an embodiment of the method, as described herein. The method eliminates hazardous emissions inherent in the alternative combustion method, and recycles reagents to minimize waste.

As depicted in FIG. 1, an alternative to the conventional approach of combusting a fuel cell membrane electrode assembly is provided. In one embodiment of an alternative method 100, a catalytic element can be extracted and recovered from an MEA by: grinding the MEA into a powder (step 110), optionally wetting the powder with a surfactant (step 120), extracting the catalytic element from the powder using an acid leachate (step 130), separating the depleted powder solids from the catalytic element-rich liquid of the resultant leachate and powder slurry (step 140), and purifying the precious metal catalytic element from the liquid using conventional refining technology (step 150). Optionally, the leachate can be recycled (step 160) for use in another extraction cycle. Each of the steps 110 through 160 in the process can comprise multiple operations, processes, or steps. Methods and apparatus for grinding the MEA into a powder using liquid nitrogen embrittlement are described in commonly owned U.S. patent application Ser. No. 11/844,723 entitled "Simplified Process for Leaching Precious Metals from Fuel Cell Membrane Electrode Assemblies," filed Aug. 24, 2007, and incorporated by reference herein in its entirety. Reagent usage and throughput can be optimized by obtaining accurate measurements of the catalytic element remaining in depleted fuel cell MEA powder after most of the catalytic element has been acid leached from the powder. Methods for conducting such measurements are described in detail in commonly owned U.S. patent application entitled "Method for Measuring Recovery of Catalytic Elements from Fuel Cells," filed concurrently with the present application, and incorporated by reference herein in its entirety.

Figure 2:
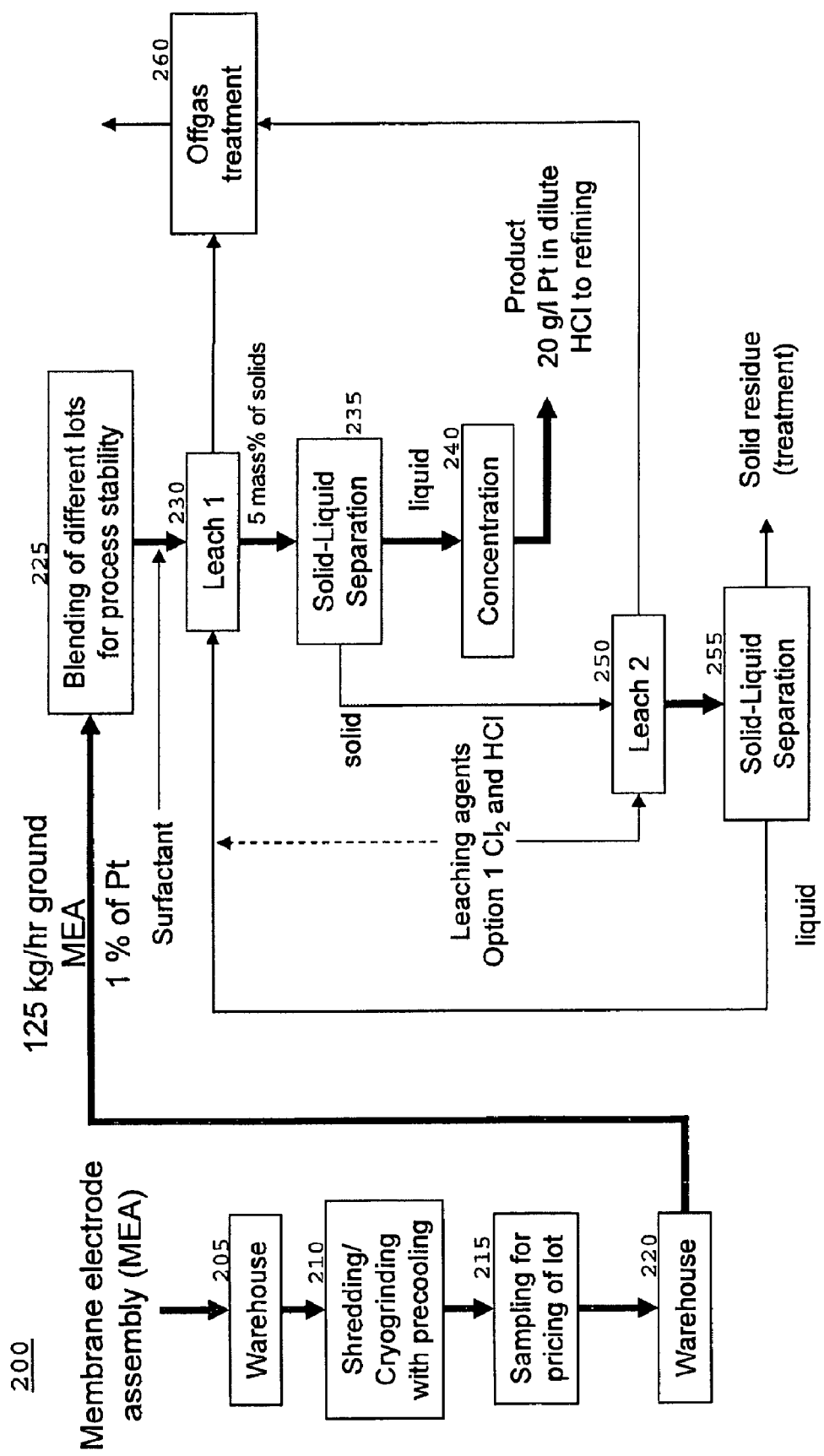
FIG. 2 is a flow chart showing a method for recovering a catalytic element from a fuel cell membrane electrode assembly.

Another embodiment of a method for recovering catalytic elements from fuel cells 200 is depicted in FIG. 2. After optional warehousing (step 205), an MEA is shredded and cryoground (step 210) into powder for further processing. If desired, the MEA powder can be sampled for pricing (step 215), to determine the recoverable catalytic element content of the powder. After another optional warehousing (step 220), powder from multiple MEAs can be blended (step 225). Next, surfactant and leachate are added for a first leach (step 230). Any off gases are treated (step 260). The leachate is separated into solids and liquid (step 235), and the liquid is concentrated (step 240) to achieve about 20 g/l Pt in dilute HCl for further refining and recovery of the platinum. The residual solids can be subjected to a second leach (step 250) and separation (step 255). Any residual solids are disposed of as solid residue, and the second leachate can be recycled for use in a subsequent first leach. Any off gases from the second leach are treated. Each of the steps 205 through 255 in the process can comprise multiple operations, processes, or steps, or can be performed in combination.

Figure 3:
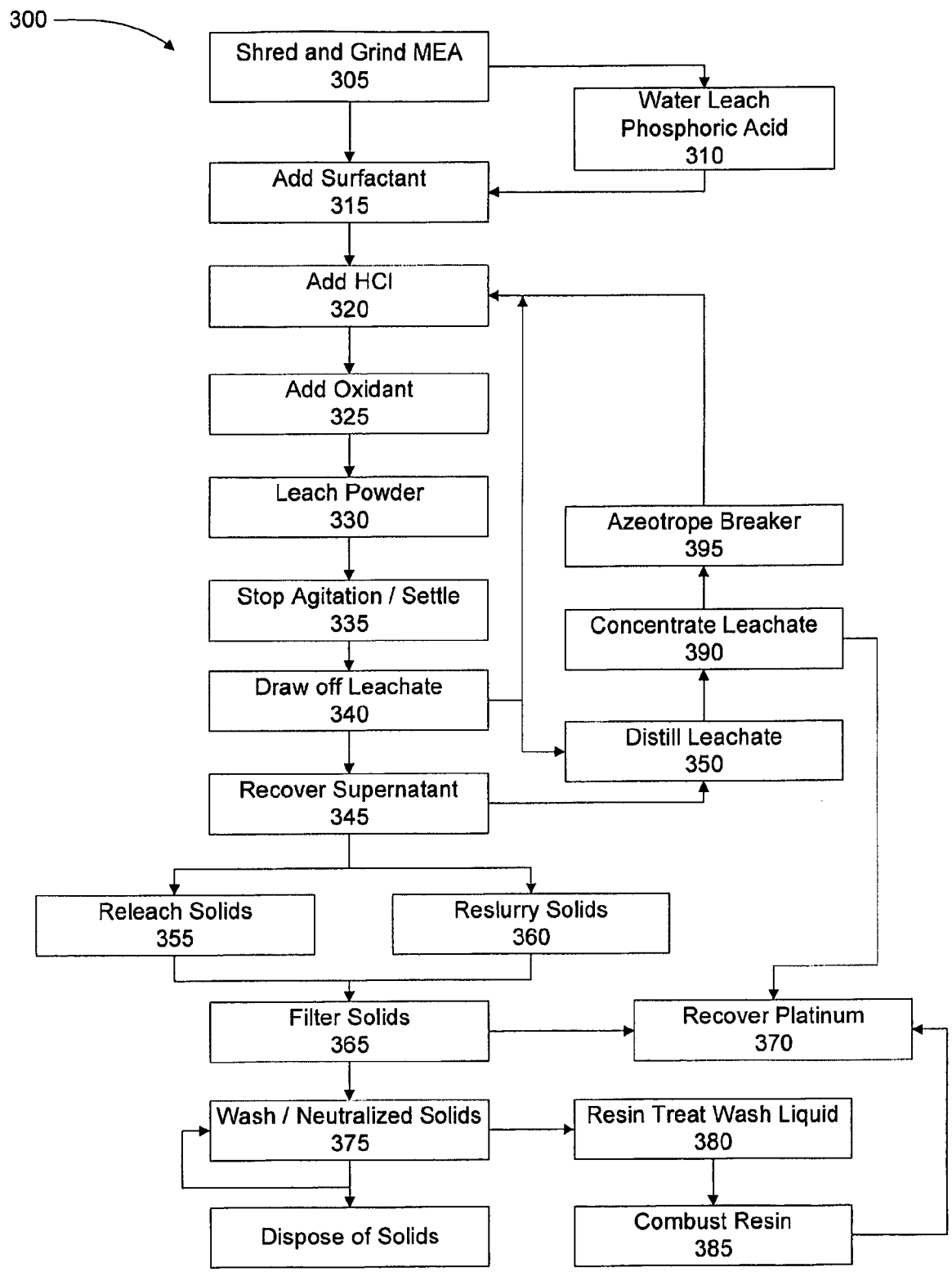
FIG. 3 is a flow chart showing a method for recovering a catalytic element from a fuel cell membrane electrode assembly.

Another embodiment of a method for recovering catalytic elements from fuel cells 300 is depicted in FIG. 3. Sheets of membrane electrode assembly are shredded and ground (step 305). If the MEA contains phosphoric acid, the shredded material is preferably washed with water to leach the phosphoric acid, and then dried (step 310). Next, a surfactant solution is added using a high shear mixer (step 315) to wet the powder into a slurry or suspension, and HCl is added to the slurry (step 320) in a vessel with agitation. An oxidant is then added to the vessel (step 325) and leaching of the powder is performed (step 330). After sufficient time for leaching of the catalytic elements from the powder, agitation is stopped and the suspension is allowed to settle (step 335) into a sediment and a supernatant. A tube with an in-line filter is inserted into the reactor and the supernatant is drawn off (step 340). The tube is inserted into the sediment in the vessel to further recovery leachate supernatant (step 345). The leachate can be distilled (step 350) and the distillate can be used for another leach, or can be directly recycled for another leach. The remaining solids can be releached (step 355) or reslurried and pumped to be filtered (step 360). During filtration of the solids (365), the filtrate is collected for platinum recovery (370) while the solids are washed and neutralized (step 375) with alkali for disposal. The wash liquid can be recycled directly for another wash or can be treated with a resin (step 380) to remove any platinum content. Platinum can be recovered from the resin by combustion (step 385). The primary leachate is concentrated by distillation (step 390) and platinum recovered from the bottom fraction. The distillate is treated in an azeotrope breaker (step 395) to facilitate recovery of HCl above the azeotropic concentration. Each of the steps 305 through 395 in the process can comprise multiple operations, processes, or steps, or can be performed in combination.

In seeking to optimize the recovery of catalytic elements from a fuel cell MEA, the efficiency of the leaching process can be improved based on parameters including, but not limited to, the leach medium, the concentration and quantity of leach medium per weight of catalytic element sought to be recovered, and the temperature, pressure, and cycle time of the leach step or steps. In the experiments discussed herein, leaches have been performed in several reactor vessels, including open glass beakers and sealed fluorinated polymer vessels. Investigations have been conducted into suitable materials for commercial scale leaching process equipment to resist the corrosive environment created by a combination comprising one or more of HCl liquid and vapor, chlorine gas, $NO_x$, and steam.

The milled MEA powder comprises electrocatalyst powder particles having pores and interstitial cavities. Each powder particle may contain a combination of catalytic elements, polymer, and other components of the MEA. The MEA powder is generally hydrophobic due to the presence of the fluoride-rich polymer. One effect of the hydrophobicity of the powder is that the powder tends to float on the surface of the acid leachate. Wetting the powder using an aqueous surfactant solution facilitates processing of the powder and enables the powder to be more readily mixed into the leachate. In one embodiment, a 10% surfactant solution is used in a mass ratio of approximately 4:1 to wet the powder. For example, 0.5 grams of powder can be wetted with 2 grams of 10% surfactant. The resultant mixture is a dilute suspension that is fluid and easily pumped.

In another embodiment, a 5% surfactant solution is used in a mass ratio of approximately 2:1 to wet the powder, thus using only about 25% of surfactant as in the previously discussed embodiment. For example, 0.5 grams of powder can be wetted with 1 gram of 5% surfactant. The resultant mixture is a suspension having a wet mud-like consistency. The surfactant and powder can be mixed in an agate mortar with a pestle. Alternatively, the surfactant and powder can be mixed in a high shear mixture. Because the subsequent leaching process will utilize an acid, including most probably hydrochloric acid (HCl), it is preferable to use a surfactant that is compatible with acid and most preferable to use a surfactant that is compatible with hydrochloric acid.

It is believed that using more surfactant than necessary to wet the powder can cause an undesirable dilution of the powder that impedes catalytic element recovery. Although it is not necessary to understand the theoretical reasons why excess surfactant impedes catalytic element recovery, it is thought that the excess surfactant may partially block the pores of the electrocatalyst powder particles, inhibiting the mass transfer of reagents into, and catalytic element out of, the pores. For example, Table 1 compares two experiments with the same solids fraction of powder but different surfactant concentrations. In both experiments, the sample contained about 2.9% platinum. In an experiment 1A, 5 grams of powder were mixed with 2.5 grams of 10% surfactant and 7.5 grams of water (i.e., a 2:1 mass dilution of the powder), and in an experiment 1B, 5 grams of powder were mixed with 10 grams of 10% surfactant (i.e., a 2:1 mass dilution of the powder using four times the amount of surfactant). Experiment 1A yielded an 82.8% platinum recovery, while experiment 1B yielded only a 78.0% recovery, thus showing a nearly 5% improvement with less surfactant. In these and other experiments, it has been observed that a successful surfactant acts, at least in part, as an agglomerant.

TABLE 1

| Experiment | Powder (g) | Surfactant (g) | Water (g) | % Pt Recovery |
|---|---|---|---|---|
| 1A | 5 | 2.5 | 7.5 | 82.8 |
| 1B | 5 | 10 | 0 | 78.0 |

Accordingly, in yet another embodiment, the powder can be made hydrophilic using a material such as polyethylene glycol, or PEG, which can serve as an agglomerant. An advantage of using an agglomerant is that it is a dry substance that does not add water to the mixture, whereas a surfactant solution is a wet substance that introduces water into the mixture. Water dilution can impede distillation of the acid leachate (e.g., hydrochloric acid), as described below. The agglomerant can be added to the milled powder before mixing with the acid leachate. Leachability studies for extracting catalytic elements from MEA powder using agglomerant are ongoing.

Once the MEA powder has been wetted with a surfactant, precious metal catalytic elements can be leached from the MEA powder. In one embodiment, the leaching can be done in a single step. However, to enhance recovery of catalytic elements, leaching is preferably done in two or more steps. A two step process is described herein, the two leaching steps achieving a balance between recovery rate and cost, noting that as the price of catalytic elements (e.g., platinum) and the cost of raw materials fluctuate, the cost of additional leaching steps may be justified by the enhanced recovery rates that can be obtained. Multiple reagent schemes can be used to create an oxidative environment necessary to extract catalytic elements from the MEA powder. In each of the schemes, the solid content is preferably in the range of approximately 5% to approximately 10%, and the primary diluent is hydrochloric acid.

In one embodiment of the leaching step, hydrochloric acid and nitric acid are mixed in a stoichiometric mole ratio of approximately 1:3 to create aqua regia, which is well known for its ability to dissolve precious metals such as platinum and gold. The aqua regia is combined with the MEA powder, and the resulting reaction and decomposition of the powder produces water, nitrogen oxides ($NO_x$), chlorine, and aqueous hexachloroplatinic acid, as follows:

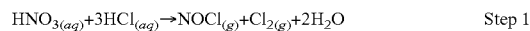  Step 1

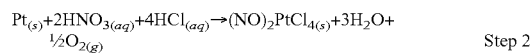  Step 2

  Step 3

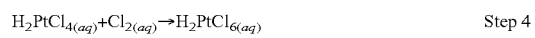  Step 4

However, because there is only about 1% platinum weight in the solids, it has been determined that stoichiometric addition of nitric acid to HCl generates about a 100-fold excess of chlorine oxidant relative to the expected platinum present in the powder, in an example with 5% solids. (By weight, the platinum in an MEA generally ranges between about 0.5% and about 4%.) Chlorine has a limited solubility in aqueous media, which continuously decreases with increasing temperature, so that the excess oxidant would be wasted. Also, a stoichiometric mixture will generate about 160 standard liters of gas (nitric oxide and chlorine) for each liter of HCl reacted, creating the potential for a large pressure build-up and high costs associated with scrubbing and neutralizing large amounts of noxious off gases for disposal.

Accordingly, in another embodiment, nitric acid is mixed with hydrochloric acid at one-tenth of stoichiometric, or a mole ratio of approximately 1:30. For example, in a 125 kg batch of MEA powder, 2375 liters of 11 molar HCl will form a mixture having about 5% solids. Adding 56 liters of 16 molar $HNO_3$ achieves a ratio of 1:30 to the HCl. The overall concentration of HCl in the mixture is about 31% to 32%, and about 90 liters of water will be produced in the series of oxidation reactions. The excess chlorine gas is reduced by about a factor of ten. Nitric acid is readily available and easily stored, and results in minimal dilution to HCl concentration in the leachate. The need to remove $NO_x$ vapor from the exhaust gas using a scrubber is a disadvantage of using nitric acid.

In yet another embodiment, hydrogen peroxide is used instead of nitric acid. The corresponding reaction sequence is:

$$H_2O_{2(aq)} + 2HCl_{(aq)} \rightarrow Cl_{2(g)} + 2H_2O \quad \text{Step 1}$$

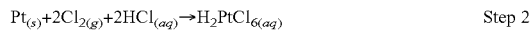
$$Pt_{(s)} + 2Cl_{2(g)} + 2HCl_{(aq)} \rightarrow H_2PtCl_{6(aq)} \quad \text{Step 2}$$

An advantage of using hydrogen peroxide rather than nitric acid is the elimination of $NO_x$ as a reaction by-product. However, because hydrogen peroxide is an unstable reagent, 50% and 70% solutions require refrigeration. Therefore, a 30% hydrogen peroxide solution is preferred, and even though it dilutes the mixture undesirably, the overall concentration of HCl in the mixture of about 32% to 33% is better than in the 1:30 nitric acid to HCl embodiment.

Hydrogen peroxide experiments using microwave assisted leaching in a pressurized vessel resulted in a high Pt yield, and hydrogen peroxide does not form $NO_x$ and thus reduced the scrubbing requirements of the process exhaust. However, hydrogen peroxide liberates nascent oxygen, which in turn liberates chlorine from HCl. In addition, an unexpected exotherm was observed when hydrogen peroxide was added to one particular MEA powder, while the corresponding nitric acid batch did not experience a similar problem.

In still another embodiment, chlorine gas is used directly as an oxidant, instead of using nitric acid or hydrogen peroxide to liberate chlorine gas from the hydrochloric acid. The overall oxidation reaction to extract the platinum is therefore more direct:

$$Pt_{(s)} + 2Cl_{2(g)} + 2HCl_{(aq)} \rightarrow H_2PtCl_{6(aq)}$$

When chlorine is used as the oxidant, the consumption of HCl is limited to the amount needed for Pt-salt formation. For example, in a 125 kg batch of MEA powder, 2375 liters of 11 molar HCl will form a mixture having about 5% solids. In extracting the platinum from the powder, only about 12.6 moles of HCl will be consumed, regardless the amount of excess chlorine added. Additionally, use of chlorine does not dilute the mixture by the addition or production of water. Therefore, the amount of chlorine added can be determined by reaction kinetics and the need to maintain sufficient chlorine in the liquid phase. Chlorine is a corrosive gas that is undesirable to store. However, chlorine can be made using an on-demand chlor-alkali plant, with the added benefit that the alkali co-product (i.e., NaOH) can be used for downstream neutralization of the acid leachate. Although chlorine cannot be made by an on-demand plant as rapidly as it can be liberated by the addition of either nitric acid or hydrogen peroxide, in some circumstances the benefits of using chlorine may outweigh the limited rate of processing of MEA powder.

Direct addition of chlorine gas has the distinct advantages that it does not cause dilution or consumption of HCl beyond the formation of chloroplatinic acid, and that it does not create any additional off gases that require scrubbing. In addition, chlorine can be made online in a chlor-alkali plant which also produces an NaOH co-product that can be used for downstream neutralization of the post-leaching sludge. However, on-demand chlorine injection may take longer than liberating chlorine using nitric acid or hydrogen peroxide. Also, storage of corrosive chlorine gas is undesirable, and a 125 kg batch of MEA powder would require about 2900 liters (128 moles or 9.1 kg) of chlorine at 1 bar, based on a 10-fold stoichiometric excess for the amount of Pt in the powder, based on a 1% Pt concentration in the powder.

In yet another embodiment, sodium chlorate ($NaClO_3$), alone or in combination with other oxidants, is used as an oxidizing agent. In the presence of HCl, sodium chlorate liberates chlorine in the form of chlorine dioxide, which is effective in oxidizing dispersed carbon (i.e., the electrocatalyst support material), thus contributing to the extraction of platinum from the MEA powder. In particular, it is believed that $ClO_2$ is better that chlorine as oxidizing agent for carbon. Sodium chloride (NaCl) is a residual by-product, and the build-up of sodium salt in the heel of the evaporator is a disadvantage of using sodium chlorate.

Although the processes discussed herein can be scaled up or down as required, aspects of a process have been developed with the goal of processing approximately 125 kg per hour of MEA powder on a batch basis. Thus, it is desired to complete a leach on a batch size of 125 kg of MEA powder at about 5% solids fraction in about an hour. Of course, it is understood that increasing the solids fraction to about 10% allows greater throughput without changing the scale of downstream operations, or allows for smaller batches and/or longer leach times. However, because higher solids concentration tends to decrease the yield rate of a first leach process, there is a point at which increasing the solids concentration will likely necessitate two or more stages of leaching.

Nevertheless, one leaching step may be sufficient to achieve the desired recovery of catalytic elements. Experiments were conducted for both CCM and GDE fuel cell powder using various leachates and under various conditions, including in an open vessel reactor at ambient pressure and at temperatures ranging from about 60° C. to about 70° C., and in a closed vessel reactor at pressures ranging between 10 bar to 40 bar (about 150 PSIG to 600 PSIG) and at temperatures up to and including about 200° C. Table 2 shows the percentage recoveries of platinum that were achieved in various experiments. In the open vessel configuration, a hot plate was used to provide heating. In the closed vessel configuration, a microwave source was used to provide heating. It can be seen in Table 2 that in an open vessel, the addition of surfactant to the aqua regia leachate and CCM powder slurry resulted an improved catalytic element recovery by nearly 30%; however, for a GDE powder and aqua regia leachate slurry, there was a minimal discernable change due to the addition of surfactant. In a closed (pressurized) vessel, aqua regia leachate performed about 6% better than hydrogen peroxide leachate for a CCM powder, but the two leachates were essentially equivalent for a GDE powder.

TABLE 2

| | % Pt Yield | | | |
|---|---|---|---|---|
| | Open Vessel 60° C.-70° C. | | Pressurized Vessel 9 atm/200° C. | |
| Fuel Cell MEA | No surfactant Aqua Regia Leachate | Surfactant Aqua Regia Leachate | No surfactant $H_2O_2$/HCl Leachate | No surfactant Aqua Regia Leachate |
| CCM | 72.5 | 94 | 92 | 97.5 |
| GDE | 93.0 | 94-96 | 97 | 96.4 |

Experiments have suggested a limit to the effective recovery rate from a single leach step. However, with optimization of parameters including but not limited to temperature, pressure, leachate composition, and hold time, sufficient recovery may be achievable in a single leach step. Some tests were conducted in open vessel conditions with minimal stirring, in which the slurry was susceptible to loss of oxidant. Other tests were conducted in closed vessel conditions but with no stirring and a large height to diameter ratio, inhibiting mixing. Accordingly, it is believed that by using an enclosed vessel, using a vessel having a height to diameter ratio closer one, and applying stirring or mixing to the slurry during the leaching process, higher yields can be obtained. Nevertheless, the single leach results are indicative that the processes disclosed herein can be very effective at extracting platinum and other catalytic elements from MEA powder.

Data suggest that the leaching of catalytic elements from the MEA powder may be limited by mass transfer, such that vigorous stirring may improve the first leach yields (i.e., recovery rates). As shown in Table 3, leaching efficiency of a 0.25 gram sample of MEA powder in a sealed vessel at 200° C. using a leachate of HCl and $H_2O_2$ indicates that leaching is not time-dependent. An excess oxidant concentration of approximately two orders of magnitude was used, yet the lack of improved yields at longer hold times reinforces the notion of a mass transfer limitation. (It is noted that the precise oxidant concentration cannot be determined because some chlorine gas was able to escape from the process before the vessel was sealed and allowed to pressurize.)

TABLE 3

| Experiment | Time at 200° C. (min) | % Pt Recovery |
|---|---|---|
| 3A | 10 | 94.4 |
| 3B | 20 | 93.5 |
| 3C | 30 | 93.6 |
| 3D | 40 | 94.2 |

The insensitivity of yield to hold time can be explained by various phenomena, particularly in view of the fact that the total volume of the leachate-containing liquid medium was approximately 100 times or more greater than the aggregated pore volume of the electrocatalyst powder particles. In one example, all of the oxidant in the liquid phase may be consumed quickly while the remaining oxidant escapes into the gas phase in the head space of the vessel. In another example, there may be an impediment for Pt to migrate into the liquid medium. In yet another example, excess surfactant may partially block pores in the MEA powder particles, thereby inhibiting leachate access to Pt in the particles. In any of these examples, vigorous mixing would be expected to improve the catalytic element recovery, because mixing would entrain fresh chlorine gas from the vessel head space into the leaching medium and disperse dissolving Pt away from the pores, thus increasing the Pt concentration gradient near the powder particles and encouraging migration of Pt into the leachate solution. Ongoing experimental work focuses on the effect of vigorous stirring in a closed vessel to improve first leach yields of catalytic elements.

Also, as shown in Table 4, the first leach yield decreases as sample size increases, in a sealed vessel at 200° C. with $HCl/H_2O_2$ as the leachate.

TABLE 4

| Experiment | Sample (grams) | Surfactant (grams) | % Pt Recovery |
|---|---|---|---|
| 4A | 0.25 | 1 | 94.4 |
| 4B | 0.5 | 2 | 92.5 |
| 4C | 1 | 2 | 81.2 |
| 4D | 1 | 2 | 77.4 |

Figure 4A:
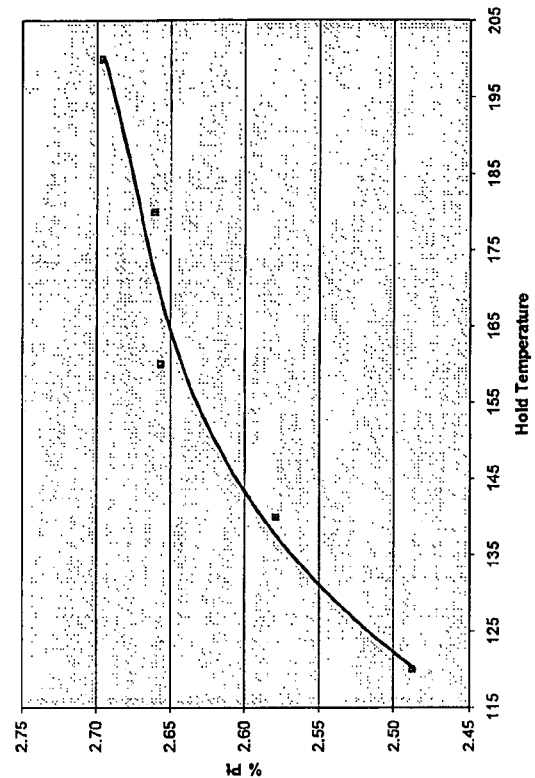
FIG. 4A is a graph showing the yield of a single leach process versus temperature in a closed vessel heated by microwave energy.
Figure 4B:
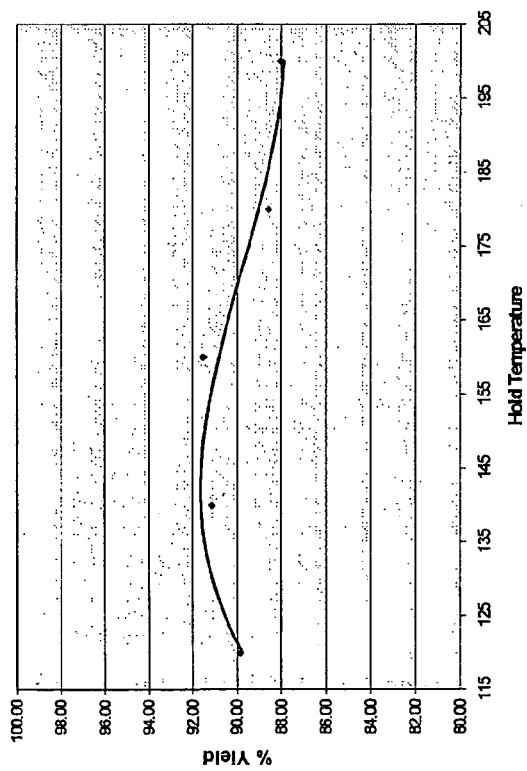
FIG. 4B is a graph showing the amount of recoverable platinum versus temperature at the same conditions as in FIG. 4A.
Figure 4C:
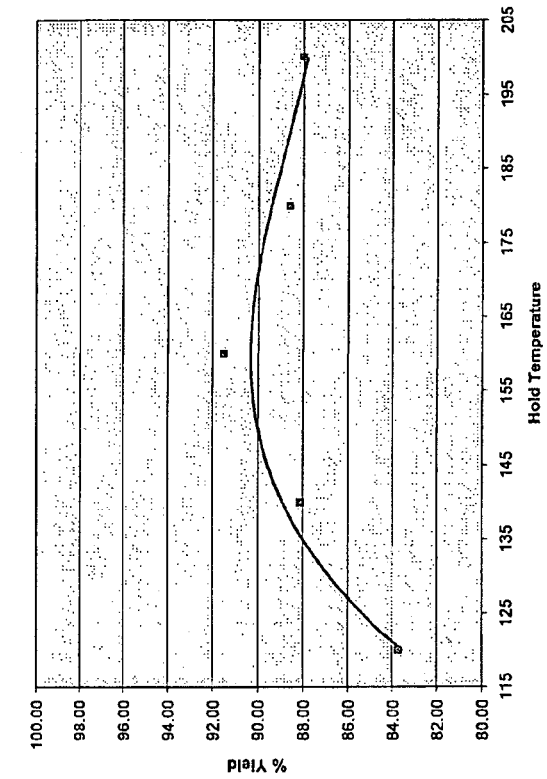
FIG. 4C is a graph showing the normalized yield of a single leach process versus temperature by correcting the data from FIG. 4A with the recoverable platinum data from FIG. 4B.

Temperature has countervailing effects on catalytic element recovery from an MEA powder. In experiments using a combination Pt/Ru alloyed electrocatalyst in a pressurized vessel heated by microwaves using an $HCl/H_2O_2$ leachate, the platinum yield appears to be relatively constant between about 120° C. and 200° C., with a peak near 150° C., as shown in FIG. 4A. However, the amount of recoverable Pt increases with increasing temperature over the same range, as shown in FIG. 4B. Normalizing the yield rates by the maximum recoverable amount of Pt indicates a peak in yield near about 160° C., as shown in FIG. 4C. It is believed that chlorine solubility may restrict Pt recovery at higher temperatures; even though Pt becomes more soluble in the leachate and Pt reactivity with Cl goes up as temperature increases, the benefits of elevated temperatures are nullified to some degree by the tendency for chlorine to come out of solution at elevated temperatures.

To enhance recovery of catalytic elements, a second leaching process can be added to extract catalytic elements not extracted during a first leaching process. The improvement in catalytic element recover after a second leach can be substantial, as indicated in Table 5. All experiments were conducted in microwave heated pressurized vessels. (Note that surfactant is typically added as a 10% surfactant solution, but can also be used in 5% concentration.)

TABLE 5

| | Cumulative Yields (%) | | | | |
|---|---|---|---|---|---|
| | CCM Powder | | GDE Powder | | |
| Leach # | (Aqua Regia) HCl/HNO$_3$ + 1 gram Surfactant | HCl/ H$_2$O$_2$ + 0.5 gram Surfactant | HCl/ H$_2$O$_2$ + 1 gram Surfactant | HCl/ H$_2$O$_2$ + 1 gram Surfactant | HCl/ H$_2$O$_2$ + 1 gram Surfactant |
| 1 | 96.9 | 90.3 | 96.9 | 86.9 | 95.6 |
| 2 | 99.8 | 99.4 | 100 | 99.7 | 99.5 |

The effects of mass transfer limitations and/or liquid phase reagent depletion discussed above can be seen in reference to Table 6, in which successive leaches were conducted using a 1 gram CCM sample in a pressurized vessel at 200° C. with an $HCl/H_2O_2$ leachate. The listed yields of platinum have been corrected for loss of platinum on the filtration media.

TABLE 6

| Leach # | Experiment 6A | Experiment 6B |
|---|---|---|
| 1 | 81.2 | 77.5 |
| 2 | 96.8 | 95.5 |
| 3 | 99.3 | 97.5 |
| 4 | 99.9 | 99.8 |

After the first leaching process, the resultant slurry comprises an acid supernatant (i.e., the remnants of the leachate plus the catalytic element salt solution) and solids (i.e., the depleted MEA powder from which most of the catalytic element has been extracted). Prior to applying a second leaching process (or re-leaching) to the solids, phase separation of the products from the first leaching step is necessary. In one embodiment, the contents of the first leach reactor vessel are transferred to a volumetric buffer so that the acid supernatant can be decanted from the Pt-depleted solids. A glass-line stainless steel tank can be used for decantation. A PTFE-lined tank could also be used. Alternatively, a titanium decantation tank can be used. In another embodiment, conventional filtration can be used to separate the solids from the supernatant. In yet another embodiment, the slurry can be filtered in place by withdrawing the supernatant from an upper port in the reactor vessel, allowing the solids to settle to the lower portions of the vessel.

After separation, the residual solids can be washed or re-leached using fresh acid leachate, depending on whether a second leaching process is required to achieve the desired catalytic element recovery. While most of the extracted catalytic element is drawn into the supernatant, significant amounts of catalytic element can be retained in the pores of the MEA powder such that washing of the solids is typically required to recover the remainder of the dissolved catalytic element. In some cases, more than one wash may be required.

Once the solids are separated from the supernatant and washed, a second acid leach can be performed, followed again by washing and then by neutralization of residual solids. Alternatively, if a single leach is performed, the residual solids are washed and neutralized. The washing and neutralization can be performed in various equipment, which can be selected to work with the specific reactor vessel and to achieve good process flow.

A mechanical filtration device can be used to achieve a sufficiently high solids fraction in the residue. In one embodiment, the vessel contents can be discharged from the bottom of the vessel into a filter press. A filter press provides a simple mechanism for liquid-solid separation, and is relatively inexpensive. However, the filter press must be disassembled periodically for solids recovery and for replacement of the filtration medium, and disassembly and cleaning is time consuming and labor intensive. Also, two parallel filter presses are required for uninterrupted operation, so one can be cleaned while the other is in use.

In another embodiment, a centrifugal discharge filter, such as the ZHF filter made by Pall SeitzSchenk, can be used. Centrifugal discharge filters are expensive but have automatic discharge of solids, can achieve a high solids content, and can vent HCl vapors. Also, a candle filter can be used, with similar advantages but similar high capital cost.

In another embodiment, the vessel contents can be transferred to a rotary drum filter, where the solids can be washed, neutralized, and dried in discrete stages as the solids are drawn over a drum. In yet another embodiment, the leaching is performed in a reactor vessel and the solids are transferred to a Nutsche filter, in which the sludge remaining after filtering out most of the fluid can be neutralized prior to drying of the residual solids. In still another embodiment, a rotary drum vacuum filter, such as sold by Komline-Sanderson, can be used. A rotary drum vacuum filter can operate continuously, can achieve a high solids content, and can automatically discharge solids. In addition, HCl vapors can be vented, and the wash cycle can be performed in the device. However, rotary drum vacuum filters are capital intensive and require more maintenance than a filter press.

In still another embodiment, the washing, filtration, and drying can be performed in the same vessel as the leaching. For example, a Rosenmund filter/dryer can be used as both a reactor vessel and a vessel for washing, filtration, and drying of the solids. In combination with a filter/dryer, a microwave source can be used to supply heat to dry the residual solids in the vessel, since microwave energy couples efficiently with water to evaporate the water and leave a dried residue. When using a filter/dryer, several process steps can be performed in the same vessel. In particular, the filter/dryer enables the MEA powder to be leached, the supernatant leachate to be filtered away from the residual solids, and the solids to be washed and dried, all without the need to transfer material from one vessel to another. Further, the filter/dryer can be used in combination with a microwave energy source for efficiently heating the residue to drive off water, and with a vacuum source to draw off water vapors and increase solids concentration. Achieving a very dry solids residue reduces solid waste disposal costs. Once the solids have been neutralized to a pH of greater than about 2, they can be disposed of as non-hazardous solid waste.

The filter/dryer comprises a filter medium for separating solids from liquids and a paddle for stirring the slurry mixture during drying and for discharging dry residue from the filter/dryer. A limitation of the filter/dryer is that the rotational speed of the paddle may be insufficient to properly mix the gas and liquid phases during the leach, allowing the liquid phase to become depleted of chlorine. Accordingly, chlorine gas can be added from beneath the filter medium so that it percolates through the liquid leach phase.

Figure 5:
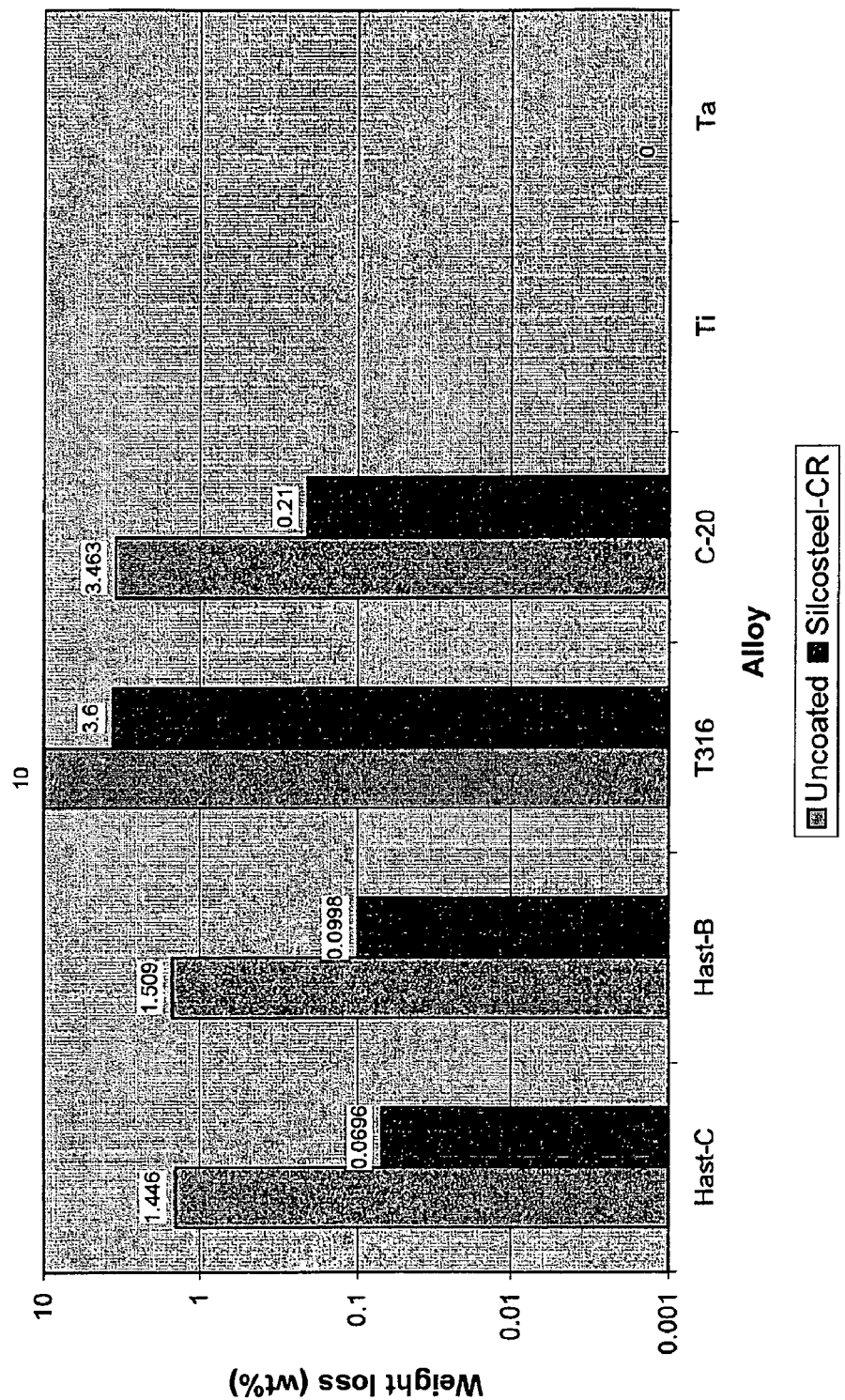
FIG. 5 is comparison bar chart showing the relative corrosion of various tank materials when exposed to a mixture of HCl and $H_2O_2$ leachate.

Regardless which vessel or apparatus is used to filter the solids from the leachate solution, the corrosive nature of the slurry requires materials of construction that can withstand corrosion. FIG. 5 illustrates the corrosion of various materials, in percent weight loss, when exposed to chlorine. A Hastelloy C276 metal coupon was tested and corroded badly. Glass lined vessels, such as those fabricated by De Ditrich and Pfaudler, have been shown to fare better when exposed to acid, but such vessels are typically limited to pressures of less than about 10 bar (150 PSIG). For example, according to vessel manufacturer data, a 20% HCl mixture at 160° C. corrodes away about 20 mils per year from a glass liner. However, trace HF from the degraded perfluoropolymer membrane could attack the glass liner. The addition of dispersed silica acts as a fluorine getter to protect the glass liner, and testing has shown that 100 ppm of $SiO_2$ added to the mixture reduces the glass liner corrosion to about 2 mils per year at 160° C. Boric acid can also be used as a fluorine getter. In addition, titanium (Ti) vessels have shown high corrosion resistance, as indicated in Table 7, particularly when silicon is used as a barrier coating. Note that the leachable Ti was determined measuring the Ti in the leachate using an inductively coupled plasma in conjunction with optical emission spectroscopy.

TABLE 7

| Experimental Conditions | Leachable Ti (mg) | Weight Loss (%) |
| --- | --- | --- |
| Uncoated Ti vessel 16.5 mL HCl/5 mL $H_2O_2$ 10 minutes @ 125° C. (chlorine) | 0.61 | 0.0074 |
| Silicon-coated Ti vessel 16.5 mL HCl/5 mL $H_2O_2$ 10 minutes @ 125° C. (chlorine) | 0.022 | 0.0003 |
| Silicon-coated Ti vessel 16.5 mL HCl/5 mL $H_2O_2$ 30 minutes @ 150° C. (chlorine) | 0.32 | 0.0039 |
| Silicon-coated Ti vessel 16.5 mL HCl/5 mL $HNO_3$ 10 minutes @ 125° C. (aqua regia) | 0.038 | 0.0005 |

After separation of the solids from the HCl-rich leachate solution, the dissolved platinum salt must be concentrated prior to purification. In one embodiment, a 20 g/l Pt solution in HCl can be purified using ammonium chloride precipitation. When processing a typical MEA having 1% Pt in a slurry with 5% solids content, the concentration of Pt in a first leach will be approximately 5000 ppm or about 0.5 g/L. Therefore, to achieve a target concentration of about 20 g/L of Pt, the concentration must be increased by a factor of about forty. For example, in a 200 kg batch of MEA, about 3600 liters of leachate solution will have to be distilled to reach the desired Pt concentration. The bottoms or solids left over from the distillation process contain concentrated Pt salt that can be sent for purification and recovery of the Pt. Similarly, for a 125 kg batch, 2375 liters of leachate solution will be distilled by evaporating about 2250 liters.

The resultant large volume of distillate contains HCl that must be either neutralized or reused. Neutralizing the distillate forms a significant amount of salts that must then be disposed of, and is therefore less desirable than reuse. For example, for a batch size of 125 kg of MEA powder having 1% platinum and mixed with leachate in a 5% solids fraction, the leaching medium will have a volume of 2375 liters, which can be reduced to about 2250 liters if the solids content is increased to 10%.

After a single leach process is performed, a concentration of about 0.5 g/l of Pt in the leach liquor is concentrated to about 20 g/l of Pt, and the concentrated heel is transferred to a salts purification process. When Pt is concentrated using an evaporator, HCl distillate is preferably recycled and reused rather than neutralized, to avoid the high cost and storage problems of caustic, and the regulatory limitations on salt discharge. However, reuse may require reconcentration of the acid which has been decreased by the leaching process. In particular, the oxidation of HCl to liberate $Cl_{2(g)}$, for example by the addition of $HNO_3$ or $H_2O_2$, causes a decrease in HCl concentration. Further, reuse of the distillate is limited by the fact that HCl forms an azeotrope with water, the azeotrope having a boiling point of 109° C. and a vapor HCl concentration of about 20%. By contrast, commercially available concentrated HCl has a concentration of about 37%. If it is desired to increase the HCl concentration of the recovered condensate to greater than 20%, process control can be performed using a specific gravity analyzer, such as made by Anton Paar, which can both monitor HCl concentration in the condensate and control the addition of make-up concentrated HCl to achieve a desired concentration.

In one embodiment, the leach process can use the condensate at reduced concentrations of HCl. Experiments indicate that a diluted HCl combined with $HNO_3$ can serve as an effective leachate, as shown in Table 8, which compares experiments using 20% HCl from condensate with 50% diluted 37% HCl concentrate (i.e., 18.5% HCl). The experiments were conducted in an open vessel heated by a hot plate at either 125° C. or 150° C. It is believed that the results can be optimized by adjusting the level of surfactant to accommodate the reduced HCl concentration. However, use of reduced HCl concentrations for successive leaches could be problematic as the HCl concentration is further reduced each time it is used in a leach process and the condensate is recovered.

In another embodiment, the distillate is condensed and redistilled using an azeotrope breaker to shift the equilibrium point toward higher HCl concentration in the vapor phase. In particular, the HCl/water mixture is dehydrated using a hydroscopic salt as a drying agent, such as alkaline earth chloride ($CaCl_2$). Another such hydroscopic salt is magnesium chloride. The drying agent reduces water content in the vapor phase by absorbing water, thereby increasing the concentration of HCl in the vapor phase. Using the azeotrope breaker, anhydrous HCl vapor is produced, which can be condensed and used as concentrated HCl in a subsequent leach process. The remaining salt of the azeotrope breaker can be thermally regenerated (i.e., heated to drive off the water) and reused as a drying agent. In yet another embodiment, HCl vapor beneficiation can also be performed using a differential pressure approach, either separately or in combination with the azeotrope breaker.

In order to reduce the amount of HCl that must be recovered or disposed of, experiments have been conducted to determine the impact on leaching of using reduced HCl dosages. As shown in Table 8, halving the dosage of HCl in an aqua regia regimen resulted in only a small decrease in catalytic element recovery.

To further minimize reagent usage and to limited the amount of waste generated, additional recycling steps can be taken. In one embodiment, HCl is distilled from the primary leachate, with or without an azeotrope breaker, as discussed above. Because the HCl is necessarily diluted during leaching (including by consumption of chlorine in the Pt salt and by losses of chlorine from the reactor vessel), a portion of the distillate is discarded to waste and the volume is made up with concentrated HCl at 37%. When an azeotrope breaker is used to concentrate HCl in the distillate, the condensate can be dissolved in water to make an HCl solution at between about 30% and about 37% concentration. The mildly acidic water left over from the azeotrope breaker distillation can be used for residue washing.

In another embodiment, waste can be further reduced by reusing the stream of fluid derived from washing the depleted MEA powder. The concentration of Pt in the wash fluid is low, so reusing the fluid for multiple washes increases the Pt concentration and enhances the efficiency of Pt recovery. The Pt in the recycled wash fluid can be concentrated by distillation, with the condensate being recycled for reuse as wash fluid. However, distillation from a low starting concentration is energy inefficient and creates a large volume of off-gases that require scrubbing. Alternatively, the wash fluid can be treated using ion exchange, complexation, or chelating resins to selectively remove Pt. The treated wash fluid can then be reused until the chloride level in the fluid exceeds a value that interferes with the selectivity of the resin, or a concentration equivalent to approximately 1 molar HCl. When the capacity of the resin is exhausted, the resin is combusted and the residual Pt recovered using mineral acids such as aqua regia.

TABLE 8

| Net HCl Concentration (%) | Temp (° C.) | Sample (g) | Surfactant (g) | HCl (ml) | $H_2O$ (ml) | $HNO_3$ (ml) | % Pt | % Yield |
|---|---|---|---|---|---|---|---|---|
| 20 | 125 | 0.536 | 1.04 | 16 | 0 | 6 | 2.67 | 93.66 |
| 18.5 | 125 | 0.535 | 1.01 | 8 | 8 | 6 | 2.62 | 90.08 |
| 18.5 | 125 | 0.529 | 1.00 | 8 | 8 | 3 | 2.58 | 89.61 |
| 20 | 150 | 0.511 | 1.02 | 16 | 0 | 6 | 2.68 | 95.81 |
| 18.5 | 150 | 0.516 | 1.01 | 8 | 8 | 6 | 2.63 | 93.53 |
| 18.5 | 150 | 0.513 | 1.04 | 8 | 8 | 3 | 2.64 | 92.53 |

Figure 6:
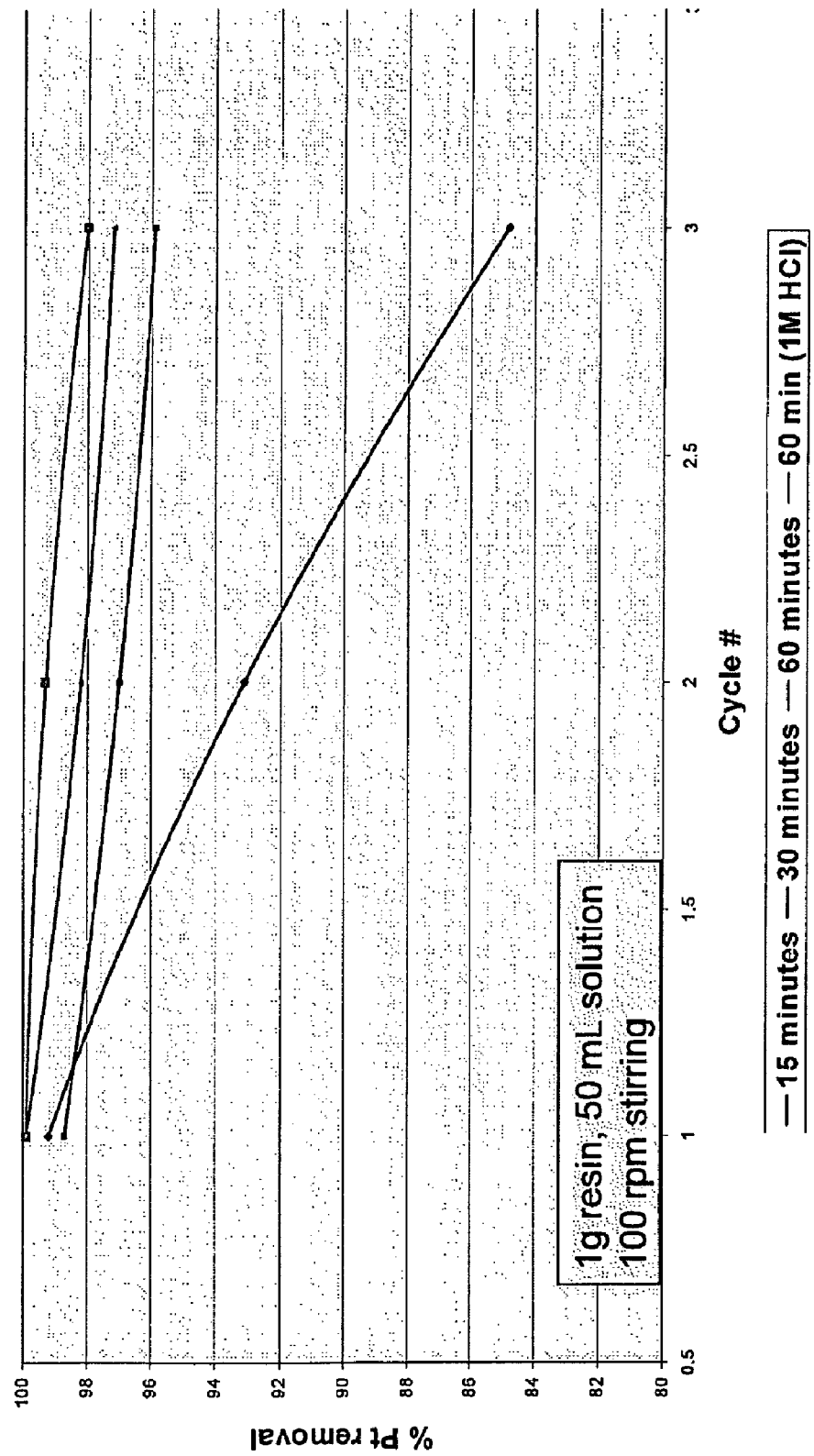
FIG. 6 is a graph showing the competition of chloride with resin for platinum ions, and the impact of cumulative cycles on platinum removal from leachate solution using resin.

As shown in FIG. 6, resin can be reused for multiple platinum recovery cycles before it is exhausted, although exhaustion occurs more quickly with more concentrated HCl solutions. Note that the data shown in FIG. 6 was developed using an isothioureanium resin and is specific thereto; other resins may be less sensitive to chlorine concentration.

The leaching processes discussed above are intended for use with the powder produced by grinding a conventional PEM MEA. An MEA using a PBI membrane will have a weight content of phosphoric acid of about 25%, and therefore must be handled somewhat differently. Unless removed prior to leaching, the phosphoric acid not remaining in the leachate will leach out and be concentrated in the heel during leachate evaporation as precipitated insoluble base metal salts of metals alloyed with Pt in the electrocatalysts. Accordingly, the phosphoric acid is preferably removed upstream by leaching the PBI MEA in hot water. Hot water leaching of ¼" strips of PBI MEA resulted in removal of about 80% of the phosphoric acid, a removal rate that is expected to improve to at least about 95% when shredded PBI MEA is leached in hot water. However, prior to cryo-grinding and milling, excess moisture should be removed, preferably by centrifugal separation. It should be noted that while phosphoric acid has no significant impact on Pt leaching from the MEA powder, it can introduce complications into the downstream processing of the leachate liquor if it is not removed.

Figure 7:
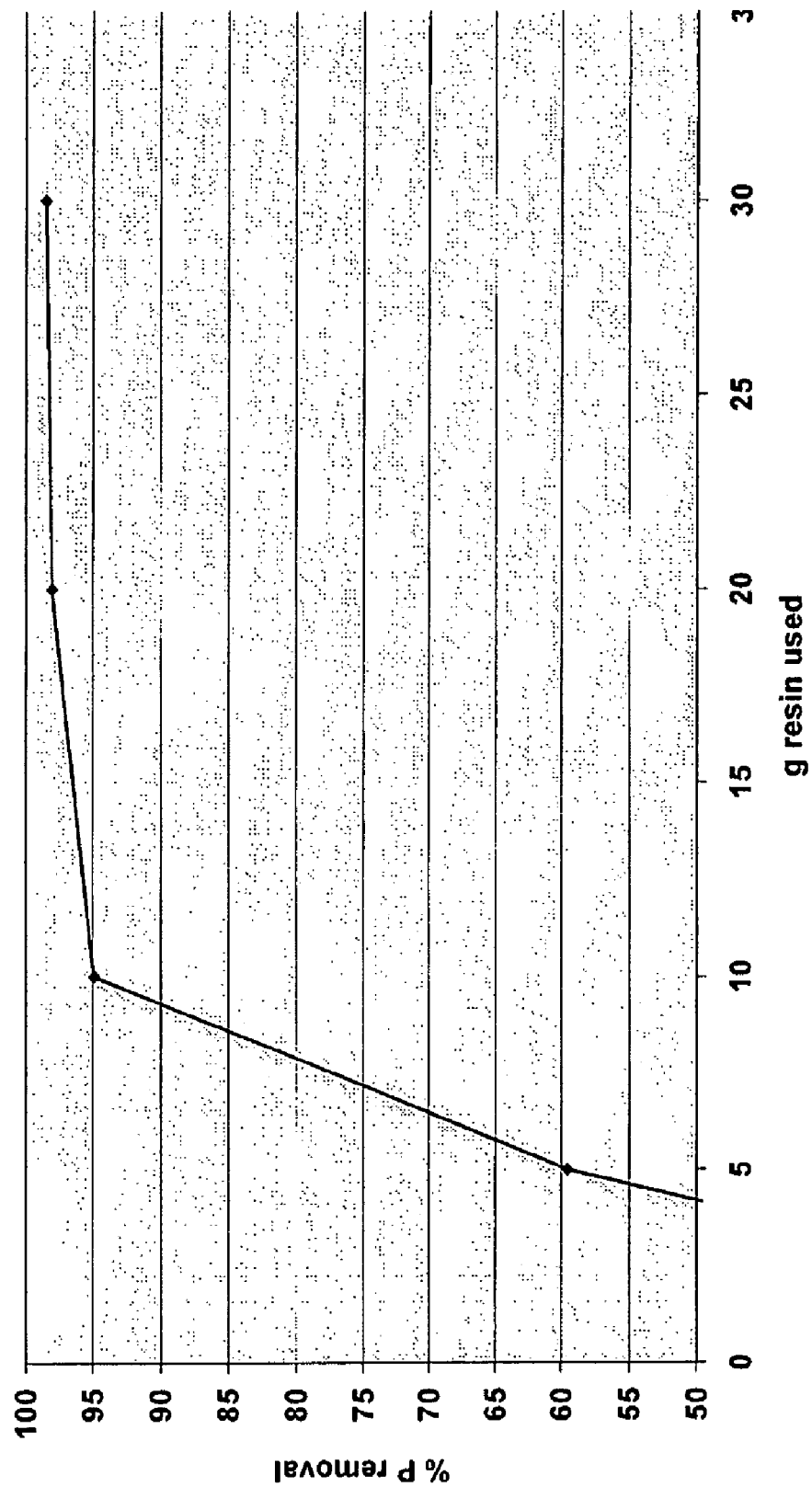
FIG. 7 is a graph showing the removal of platinum from PBI leach water solution versus grams of resin for a 50 ml batch.

Therefore, in one embodiment a separate shredder is used to shred PBI MEAs and the shredded material is leached in hot water to remove phosphoric acid. In another embodiment, a separate process can be conducted to extract catalytic elements from PBI MEAs, including ammonium chloroplatinate precipitation. When a PBI MEA is hot water leached, the leach water can be treated by precipitating the phosphate with lime. Alternatively, the dilute phosphoric acid can be absorbed using a neutralizing resin such as Dowex M43. FIG. 7 shows the effectiveness of resin at removing platinum from the PBI leach water, as long as a threshold amount of resin is used.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

We claim:

1. A method for recovering a catalytic element from a fuel cell membrane electrode assembly, comprising:
    grinding the membrane electrode assembly into a powder;
    adding an agglomerant to the powder to facilitate forming a slurry with an acid leachate;
    extracting the catalytic element by forming a slurry comprising the powder and an acid leachate adapted to dissolve the catalytic element into a soluble salt;
    separating the slurry into a depleted powder and a supernatant containing the catalytic element salt;
    washing the depleted powder to remove any catalytic element salt retained within pores in the depleted powder; and
    purifying the catalytic element from the salt.

2. The method of claim 1, wherein the acid leachate comprises HCl and $HNO_3$.

3. The method of claim 2, wherein the concentration ratio of HCl to $HNO_3$ is about 3:1.

4. The method of claim 2, wherein the concentration ratio of HCl to $HNO_3$ is about 30:1.

5. The method of claim 1, wherein the acid leachate comprises HCl and $H_2O_2$.

6. The method of claim 1, wherein the acid leachate comprises HCl and chlorine gas.

7. The method of claim 1, wherein the acid leachate comprises HCl and $NaClO_3$.

8. The method of claim 1, further comprising recycling the supernatant to be used as an acid leachate.

9. The method of claim 8, wherein recycling the supernatant comprises distilling the supernatant and concentrating acid in the distillate using an azeotrope breaker.

10. The method of claim 1, further comprising adding a surfactant solution to the powder to facilitate forming the slurry with the acid leachate.

11. The method of claim 1, wherein the depleted powder comprises residual catalytic element, the method further comprising:
    extracting the residual catalytic element by forming a second slurry comprising the depleted powder and an acid leachate adapted to dissolve the catalytic element into a soluble salt;
    separating the second slurry into a second depleted powder and a second supernatant containing the catalytic element salt;
    washing the second depleted powder to remove any catalytic element salt retained within pores in the second depleted powder; and
    purifying the catalytic element from the salt.

12. The method of claim 1, wherein the fuel cell membrane assembly comprises phosphoric acid, the method further comprising leaching the phosphoric acid by washing the powder with hot water prior to extracting the catalytic element.

13. The method of claim 1, wherein the catalytic element is platinum.

14. The method of claim 1, wherein the catalytic element is ruthenium.

15. A method for recovering platinum from a fuel cell membrane electrode assembly, comprising:
    shredding and cryogrinding the membrane electrode assembly into a powder;
    adding an agglomerant to the powder to facilitate forming a slurry with an acid leachate;
    mixing the powder with a surfactant and a leachate to form a slurry;
    separating the slurry into solids and a liquid, the liquid including a platinum salt;
    concentrating the platinum salt in the liquid; and
    refining the platinum from the platinum salt.

16. The method of claim 15, wherein the leachate comprises hydrochloric acid and an oxidant.

17. The method of claim 16, wherein the oxidant comprises at least one of nitric acid, hydrogen peroxide, chlorine gas, and sodium chlorate, alone or in combination.

18. The method of claim 15, wherein the platinum concentration in the powder is in the range of about 0.5% to about 4% by weight.

19. The method of claim 15, further comprising:
    mixing the solids with a second leachate to form a second slurry;
    separating the second slurry into residual solids and a second liquid, the second liquid including a platinum salt; and
    refining the platinum from the platinum salt.

20. The method of claim 19, further comprising recycling the second liquid to be used as a leachate.

21. A method for recovering platinum from a fuel cell membrane electrode assembly which contains phosphoric acid, comprising:
    shredding and grinding the membrane electrode assembly into a powder;
    leaching the shredded and ground powder with water to remove the phosphoric acid;
    adding a surfactant solution to the powder using a high shear mixer;

mixing hydrochloric acid and an oxidant with the powder to form a slurry having supernatant and solids;
separating the supernatant from the solids;
distilling the supernatant to separate a hydrochloric acid distillate and a heel, whereby platinum salts are concentrated in the heel; and
recovering platinum from the platinum salts.

22. The method of claim 21, further comprising:
washing the solids with a wash liquid;
treating the wash liquid with a resin to capture platinum from the wash liquid; and
recovering the platinum from the resin.

23. The method of claim 21, further comprising:
recycling the distillate for use in forming a slurry with another powder.

24. The method of claim 21, further comprising:
concentrating hydrochloric acid in the distillate by using an azeotrope breaker; and
recycling the concentrated acid distillate for use in forming a slurry with another powder.

* * * * *